Nov. 27, 1951  J. L. DE LYRA  2,576,449

SAFETY PIN

Filed June 1, 1950

*INVENTOR.*
JOSEPH L. DE LYRA

BY

ATTORNEY

Patented Nov. 27, 1951

2,576,449

UNITED STATES PATENT OFFICE 2,576,449

SAFETY PIN

Joseph L. de Lyra, Brooklyn, N. Y.

Application June 1, 1950, Serial No. 165,542

2 Claims. (Cl. 24—157)

This invention relates to new and useful improvements in safety pins.

The common safety pin generally in use comprises a wire spring having a central coil continuing into a pin shank with a pointed end at one side and a support arm at the other side. A head for the safety pin is mounted on the support arm and the pointed end of the pin shank engages therein. However, safety pins of this type are not safe in that a little pressure accidentally applied to the pin shank will open the pin. This is particularly dangerous for small children who still wear diapers, and larger children who still have not full control of their functions. Of course, it is needless to say that pin pricks may cause dangerous infections.

In the past numerous attempts have been made to vary the common safety pin so that the pin shank is locked closed and cannot be accidentally opened. However, these past attempts have failed and are not in use because of inherent mechanical defects. They relied upon forming the pin head with springy latch parts, or mounting springy latch parts on the pin head for maintaining the pin shank in its locked position. But these springy heads or springy parts placed on the heads are so unreliable that the constructions were never adopted.

This invention proposes a new safety pin in which the central coil of the spring wire is the only resilient member whch urges the safety pin into its locked position. In the new safety pin it is proposed to provide a head for receiving the pin shank and to arrange this head so that it may swivel to an open position. However, in the closed position it is the coil of the spring wire that holds the head in place.

Another feature of the new safety pin resides in the fact that it may be easily opened and closed merely by swiveling the head from its closed position to its open position, and vice versa.

Another object of the invention is the construction of a safety pin as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 6:
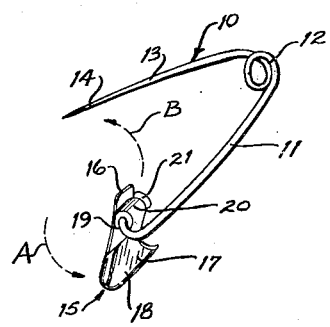
Fig. 6 is a perspective view showing the pin in its fully opened condition.

The new safety pin, in accordance with this invention, comprises a wire spring 10 having a support arm 11 continuing into a central coil 12 which continues into a pin shank 13 provided with a pointed end 14. The central coil 12 acts to urge the support arm 11 and the pin shank 13 into a widely spaced condition, as illustrated in Fig. 6, which represents the open position of the pin. A flat sheath-like head 15 having slightly spaced front and back walls 16 and 17, respectively, joined at their tops with a bent portion forming a socket 18 for the point 14, is mounted upon the pin shank 11 in a certain way.

More particularly, the outer end of the pin shank 11 has a small section 19 bent inwards parallel to the main body of the pin shank 11. The back wall 17 of the head 15 is formed with a coiled portion 20 which is swivelly mounted on the inwardly bent portion 19. The end of the portion 19 is provided with a head 21 to keep the coiled portion 20 from coming off the portion 19. The bent portion 18 forms a socket for receiving and encasing the pointed end 14 of the pin shank 13 in the closed position of the safety pin.

The coiled portion 20 swivelly supports the flat sheath-like head 15 so that the head 15 may pivot from an upward position between the support arm 11 and pin shank 13, illustrated in Figs. 1–4, to a position downwardly past a plane at right angles to the plane containing the support arm 11 and the pin shank 13, as illustrated in Fig. 6. Fig. 5 shows the head 15 in a position substantially at right angles to the plane containing the support arm 11 and the pin shank 13.

The flat sheath-like head 15 when in its said upward position is of a height less than the normal distance between the end portions of the support arm 11 and pin shank 13 when the latter parts are in their spaced closed position of the safety pin in its closed position, in order that said central coil 12 will hold the safety pin in its said closed position.

Figure 1:
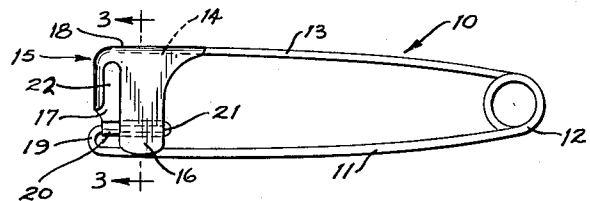
Fig. 1 is an elevational view of a safety pin constructed in accordance with this invention.
Figure 2:
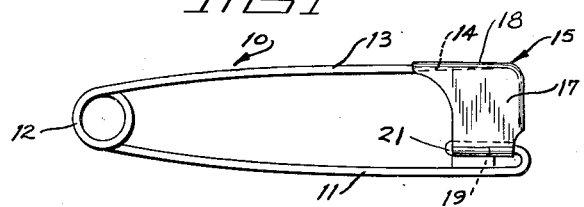
Fig. 2 is a rear view of Fig. 1.
Figure 3:
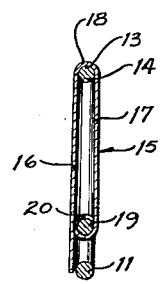
Fig. 3 is a sectional view taken on the line 3—3 of Fig. 1.

The front wall 16 is of substantially T-shape as viewed in Fig. 1, comprising the vertical stem of the T-shape and the crossing head. With this construction there is a space 22 between the stem portion of the T-shape and the outer edge of the head 15. The pin point 14 of the pin shank 13 is aligned with this space 22 when the safety pin is opened and closed in order to prevent frictional engagement between the point 14 of the pin shank 13 and the head 15 while the pin is being opened and closed.

Figure 4:
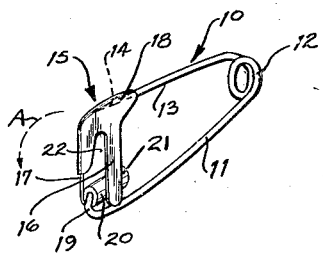
Fig. 4 is a perspective view of the safety pin seen from the front.
Figure 5:
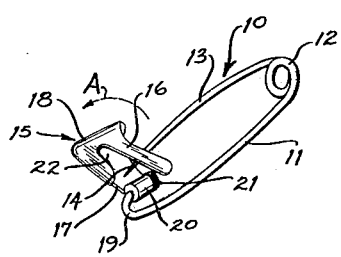
Fig. 5 is a perspective view similar to Fig. 4 but illustrating the head of the pin partially pivoted to indicate the position of the head while the pin is being opened or closed.

The operation of the safety pin may be understood from the following:

In Fig. 4 the safety pin is shown in its closed position. It may be opened merely by swivelling the head 15 counter-clockwise, as indicated by the arrow A. When the head 15 reaches substantially the horizontal position, as illustrated in Fig. 5, it will be in the neutral position in which further pivoting counter-clockwise of the head 15 will cause the pin shank 13 to take up the turning of the head 15 counter-clockwise to open the pin. From the neutral position shown in Fig. 5 the head 15 may be moved slightly clockwise and then the pin shank 13 will complete closing of the pin by forcing the head 15 further clockwise to the vertical position. In Figs. 5 and 6, arrow A indicates further pivoting of the head 15 for opening the safety pin.

In Fig. 6 the pin is illustrated completely opened with the head 15 in its freely depending position. The arrow B indicates the path taken by the pin shank 13 as it was released from head 15 and opened. The safety pin may be reclosed by manually forcing the pin shank 13 down across the coiled portion 20 of the head 15 and then pivoting the head 15 clockwise, first to the horizontal position shown in Fig. 5, and then slightly further so that the pin shank 13 may be released and complete closing of the safety pin.

An important feature of the invention resides in the fact that the head 15 is not provided with any stamped out catch parts or resilient parts which snap closed to hold the safety pin closed. The coil 12 of the spring comprises the sole element which holds the safety pin in its closed position. Since this coil 12 is formed from heavy spring steel wire it acts to reliably hold the safety pin in the closed position.

While I have illustrated and described the preferred embodiment of my invention, it is to be understood that I do not limit myself to the precise construction herein disclosed and the right is reserved to all changes coming within the scope of the invention as defined in the appended claims.

Having thus described my invention, what I claim as new and desire to secure by United States Letters Patent is:

1. A safety pin, comprising a wire spring having a support arm continuing into a central coil continuing into a pin shank in a plane common with said support arm and normally positioned above said arm and said pin shank having a pointed end and said central coil acting to urge said support arm and pin shank into a spaced open condition, a flat sheath-like head having slightly spaced front and back walls normally positioned in planes to the sides of said first-named plane and parallel to said first-named plane, and said front and back walls being joined at their tops with a bent portion socket for receiving and encasing said pointed end of said pin shank in the closed position of said safety pin, said back wall being swivelly mounted on said support arm in order that said flat sheath-like head may pivot from an upward position between said support arm and pin shank to a position downwardly past a plane at right angles to a plane containing said support arm and pin shank, and said flat sheath-like head when in said upward position being of a height less than the distance between the end portions of said support arm and pin shank in said spaced open position in order that said central coil will hold said safety pin in its closed position, and when said flat sheath-like head is in said right angle position said pin shank will engage said front wall in order that said central coil will force said flat sheath-like head open or closed depending upon whether said head is pivoted slightly downwards or upwards.

2. A safety pin as defined in claim 1 in which said front wall is substantially of T-shape and the stem of said T-shape normally extending downwards past the point at which said back wall is swivelled on said support arm.

JOSEPH L. DE LYRA.

REFERENCES CITED

The following references are of record in the file of this patent:

UNITED STATES PATENTS

| Number | Name | Date |
|---|---|---|
| 671,615 | Snedeker | Apr. 9, 1901 |
| 756,809 | Andresen | Apr. 12, 1904 |
| 1,417,080 | Letmolee | May 23, 1922 |